United States Patent [19]

Kawai

[11] Patent Number: 5,022,672
[45] Date of Patent: Jun. 11, 1991

[54] THEFTPROOF QUICK-RELEASE TYPE CLAMPING ASSEMBLY FOR MOUNTING BICYCLE PART

[75] Inventor: Mamoru Kawai, Matsumoto, Japan

[73] Assignee: Sansin Engineering, Inc., Nagano, Japan

[21] Appl. No.: 550,818

[22] Filed: Jul. 11, 1990

Related U.S. Application Data

[63] Continuation of Ser. No. 337,044, Apr. 12, 1989, abandoned.

[30] Foreign Application Priority Data

Apr. 27, 1988 [JP] Japan .................................. 63-107065

[51] Int. Cl.⁵ ............................................. B62K 25/02
[52] U.S. Cl. .................................. 280/281.1; 280/287; 301/105 B; 301/111; 70/233; 403/143; 403/254; 411/353
[58] Field of Search ............... 403/253, 254, 261, 349, 403/355, 359, 324, 70, 143, 315; 411/522, 523, 524, 353, 354; 74/544, 523; 280/287, 279, 281.1, 288, 288.4; 301/111, 105 R, 105 B, 115, 124 R, 128; 70/233, 225, 227

[56] References Cited

U.S. PATENT DOCUMENTS

| 1,106,939 | 8/1914 | Gutmann | 280/287 |
| 1,348,767 | 8/1920 | White | 411/353 |
| 3,260,535 | 7/1966 | Jaulmes | 280/279 |
| 4,015,854 | 4/1977 | Ramond | 280/281.1 |
| 4,724,692 | 2/1988 | Turin et al. | 70/225 |
| 4,770,011 | 9/1988 | Constant | 70/233 |
| 4,789,206 | 12/1988 | Ozaki | 301/111 |

FOREIGN PATENT DOCUMENTS

| 421022 | 5/1947 | Italy | 280/288 |
| 441191 | 10/1948 | Italy | 301/105 B |
| 17444 | of 1915 | United Kingdom | 403/143 |

*Primary Examiner*—Charles A. Marmor
*Assistant Examiner*—Anne Marie Boehler
*Attorney, Agent, or Firm*—William H. Eilberg

[57] ABSTRACT

A theftproof quick-release type clamping assembly for mounting a bicycle part comprises a tie rod having one end screwed to an end nut and formed at the other end with an enlarged head, and a hollow presser member fitted around the enlarged head as movable relative thereto axially of the tie rod toward and away from the end nut in response to pivotal movement of a lever which has a shaft portion penetrating the presser member and the enlarged head. A lock member screwed to the enlarged head is advanced into abutment with the presser member when the presser member is axially moved toward the end nut, thereby directly limiting axial movement of the presser member away from the end nut. In this condition, the lever can be manually removed from the presser member and the enlarged head without using any tool, thus providing theft prevention.

4 Claims, 6 Drawing Sheets

THEFTPROOF QUICK-RELEASE TYPE CLAMPING ASSEMBLY FOR MOUNTING BICYCLE PART

This application is a continuation of application Ser. No. 07/337,044, filed Apr. 12, 1989, now abandoned.

BACKGROUND OF THE INVENTION

1. Field of the Invention

This invention relates generally to a quick-release type clamping assembly for mounting a bicycle part. It more particularly relates to a quick-release type clamping assembly for mounting a bicycle hub or a bicycle saddle, which is improved to prevent such a bicycle part from being stolen.

2. Description of the Prior Art

In relatively high quality bicycles such as sports bicycles, generally, it is often required to remove a wheel hub from a pair of fork ends of the bicycle frame for replacement or repair, for example. For this purpose, such a bicycle is provided with a quick-release type hub clamping assembly which enables quick mounting and removal of the hub by simple pivotal movement of an operating lever.

Obviously, the quick-release type hub clamping assembly is advantageous in the capability of easily removing and remounting the hub relative to the bicycle frame without using any tool, thereby enabling the rider to promptly cope with a wheel trouble during racing. However, such an advantage gives rise to a problem that the hub or wheel may be easily stolen during parking.

On the other hand, a similar quick-release type clamping assembly is increasingly used to removably or adjustably mount a bicycle saddle to the seat tube of the bicycle frame. Specifically, the saddle has a seat pillar inserted into the seat tube, and the clamping assembly with a pivotal operating lever functions to cause diametrical expansion and contraction of the seat tube at the upper end thereof. The seat pillar of the saddle is fixed to the seat tube upon diametrical contraction thereof, whereas the seat pillar is rendered slidable relative to the seat tube upon expansion thereof. Thus, the level of the saddle can be adjusted very easily and quickly by simply pivoting the operating lever of the clamping assembly.

Obviously, the quick-release type saddle clamping assembly, though very advantageous in the simplicity of saddle height adjustment, makes the saddle an easy target of theft.

It is of course possible to prevent the hub or the saddle from being stolen by using chain locks for these parts. However, such a manner of theft prevention has limited effectiveness to professional thieves. Further, it is cumbersome for the rider to carry and use many chain locks (at least four chain locks for theft prevention of the bicycle itself, the front hub, the rear hub, and the saddle).

SUMMARY OF THE INVENTION

It is, therefore, an object of the invention to provide a quick-release type clamping assembly for mounting a bicycle part, particularly a hub or a saddle, which is improved to effectively prevent that part from being stolen.

Another object of the invention is to provide a theftproof quick-release type clamping assembly which can be easily switched between a normal operating mode and a theft preventive mode.

A further object of the invention is to provide a theftproof quick-release type clamping assembly which prevents dust entry into important operating parts during theft preventive mode.

Still another object of the invention is to provide a theftproof quick-release type clamping assembly which provides a visually attractive appearance.

According to the invention, there is provided a theft proof quick-release type clamping assembly for mounting a bicycle part comprising: a tie rod having one end screwed to an end nut, the rod being provided at the other end with an enlarged head which is formed with a cam hole extending therethrough transversely of the rod; a hollow presser member fitted around the enlarged head and movable relative thereto axially of the rod toward and away from the end nut; a lever mounted to the presser member and pivotable about a pivotal axis between a clamping position and a releasing position, the lever having a cam portion received within the cam hole and eccentric relative to the pivotal axis for moving the presser member by the cam portion relative to the enlarged head axially of the rod in response to pivotal movement of the lever; lock means provided separately from the lever and operable for limiting axial movement of the presser member away from the end nut when the lever is pivoted to the clamping position; and removal facilitating means for allowing removal of the lever from the presser member without using any tool when the lock means is operated to limit axial movement of the presser member away from the end nut.

In a conventional quick-release type clamping assembly, a pivotal operating lever used to apply or relieve a clamping force is also used to bear the clamping reaction force. Thus, the operating lever cannot be pulled out after a clamping operation because this would result in complete relief of the necessary clamping force.

On the other hand, Japanese Patent Application Laid-open No. 62-241701 (Laid-open: Oct. 22, 1987; Application No.: 61-84626; Filed: Apr. 11, 1986; Inventor: Nobuo OZAKI; Applicant: MAEDA INDUSTRIES, LTD.) corresponding to U.S. Pat. No. 4,789,206 issued on Dec. 6, 1988 discloses a quick-release type hub clamping assembly which includes a lock member provided separately from a pivotal operating lever to directly limit axial movement of a presser member away from an end nut. The lock member can bear or support all of the clamping reaction force when the operating lever is unexpectedly pivoted in a releasing direction, thereby preventing the hub from being accidentally removed from the bicycle frame.

However, the operating lever of the above Japanese laid-open application is held always mounted to the presser member, so that a thief can easily use this lever to remove the hub or wheel. In fact, the lever of this prior art cannot be pulled out without using a tool such as a wrench.

The present invention, which is based on the arrangement disclosed in the above Japanese laid-open application, proposes the provision of the removal facilitating means for the lever, whereby the lever can be manually pulled out after a clamping operation to make it impossible or difficult for a thief to relieve the clamping force. In this case, the clamping reaction force is supported solely by the locking means.

The solution of the present invention seems quite simple in view of the disclosure given in the above Japanese laid-open application. However, the difficulty of the invention resides in the entirely new idea of pulling out the operating lever which is an essential part of the quick-release type clamping assembly and thus normally considered inseparable from the other elements of the clamping assembly.

Other objects, features and advantages of the invention will be fully understood from the following description of the preferred embodiments given with reference to the accompanying drawings.

BRIEF DESCRIPTION OF THE DRAWINGS

The present invention will become more fully understood from the detailed description given hereinbelow and the accompanying drawings which are given by way of illustration only, and thus are not limitative of the invention, and wherein.

DETAILED DESCRIPTION

Throughout the accompanying drawings, identical or similar parts are referred to by the same reference numerals with or without a prime (') or double prime ("). It should be appreciated that the prime or double prime is used to indicate a slight difference in configuration between parts which are identical in basic function.

Figure 1:
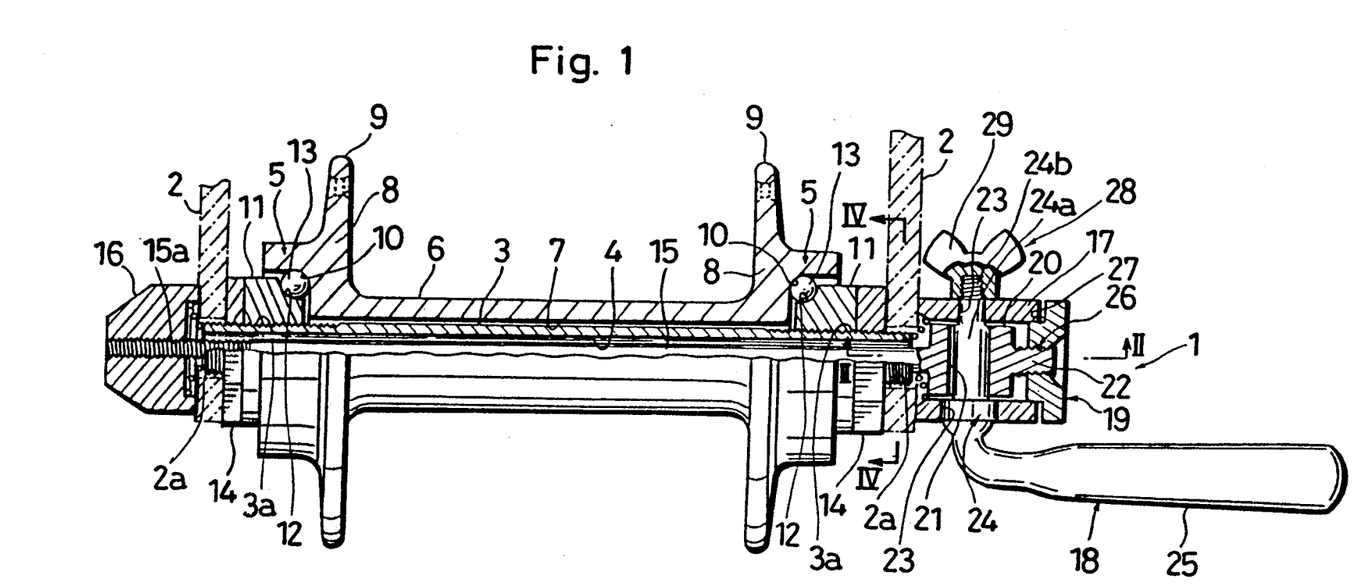
FIG. 1 is a front view, partly in section, of a theftproof quick-release type clamping assembly according to the invention as used to mount a wheel hub.
Figure 4:
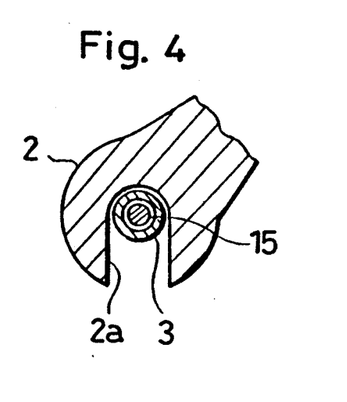
FIG. 4 is a sectional view taken on lines IV—IV in FIG. 1.

Referring now to FIG. 1 of the accompanying drawings, a theft proof quick-release type clamping assembly, generally represented by reference numeral 1, is shown as used for releasably or removably mounting a bicycle hub to a pair of front or rear fork ends 2 each having a mounting cutout 2a (see also FIG. 4).

The hub comprises a tubular hub shaft 3 having an axial through-bore 4. Rotatably supported on the hub shaft 3 by means of a pair of bearings 5 is a hollow hub shell 6 which has an axial through-bore 7 and a pair of enlarged end portions 8. Each enlarged end portion 8 is integrally formed with a mounting flange 9 to which is connected one end (radially inner end) of each spoke (not shown) having the other end (radially outer end) connected to a wheel rim (not shown). The enlarged end portion is further provided with a cup-shaped inner surface 10 which serves as an outer race of a corresponding bearing 5, as described below.

Each bearing 5 includes a ball retainer 11 adjustably screwed onto a corresponding threaded end portion 3a of the hub shaft 3 and formed with a generally conical outer surface which constitutes an inner race. An annular series of steel balls 13 is interposed between the inner race 12 and its opposed outer race 10, so that the hub shell 6 is free to rotate on the hub shaft 3. A known lock nut 14 is screwed onto the threaded end portion 3a of the hub shaft 3 axially outwardly of the retainer 11 to prevent unexpected loosening of the retainer.

The quick-release type clamping assembly 1 basically comprises a tie rod 15, an end nut 16, a hollow presser member 17, a lever 18, and a lock member 19. The details of these parts are described below.

The tie rod 15 extends through the axial bore 4 of the hub shaft 3 and has a length which is greater than that of the shaft 3, so that both ends of the rod 15 project out of the shaft. One projecting end 15a of the rod is threaded for adjustable screw engagement with the end nut which is positioned axially outwardly of one fork end 2.

The other projecting end of the rod 15 is integrally formed with an enlarged head 20 having a cam hole 21 which is elongated in cross section (see FIG. 2) and extends through the head 20 perpendicularly to the rod 15. The head 20 further has an integral projection 22 which is threaded and extends axially outwardly from one side of the head 20 opposite the rod 15. According to the illustrated example, the head 20 has a cylindrical outer surface.

The presser member 17, which is cylindrical according to the illustrated example, is fitted around the enlarged head 20 of the tie rod 15 at a position axially outwardly of the other fork end 2. The presser member is provided in its wall thickness with a diametrically opposite pair of lever receiving holes 23 substantially in corresponding relation to the cam hole 21. The two lever receiving holes 23, though differing in diameter, provides a common pivotal axis 0 (see FIG. 2) for the lever 18.

The lever 18 has a shaft portion 24 rotatably received in the lever receiving holes 23 of the presser member 17 and extending through the cam hole 21 of the enlarged head 20. The lever further has an arm portion 25 extending perpendicularly from the shaft portion 24. That part of the shaft portion 24 positioned within the cam hole 21 constitutes a cam portion 24a which is eccentric relative to the pivotal axis O of the lever 18 provided by the lever receiving holes 23, as better illustrated in FIG. 2. Thus, when the lever 18 is pivoted back and forth, the eccentric cam portion 24a of the lever causes the enlarged head 20 to move axially relative to the presser member 17 to vary the distance between the presser member 17 and the nut 16. Though the eccentric cam portion 24a also moves transversely of the rod 15 upon pivotal movement of the lever 18, such transverse movement of the cam portion is allowed without causing transverse oscillation of the rod 15 because the cam hole 21 is elongated in cross section transversely of the rod 15 (see FIG. 2), as already described.

The lock member illustrated in FIG. 1 centrally has a threaded axial bore 26 for adjustable screw engagement with the threaded projection 22 of the enlarged head 20. The lock member further has an annular outer stopper portion 27 for abutment with the axially outer end of the presser member 17. Thus, when the lock member 19 is screwably moved on the threaded projection 22 into abutment, at the stopper portion 27, with presser member 17, the presser member is no longer movable axially away from the end nut 16.

In accordance with the invention, a removal facilitating means 28 is provided which enables manual removal of the lever 18 from the presser member 17 without using any tool. According to the example illustrated in FIG. 1, the removal facilitating means 28 comprises a butterfly nut 28 which is screwed on a threaded end 24b of the lever shaft portion 24. Obviously, when the butterfly nut 29 is loosened out of engagement with the threaded end 24b, the lever shaft portion 24 can be pulled out of the lever receiving holes 23 of the presser member 17 and the cam hole 21 of the enlarged head 20.

Figures 2, 3:
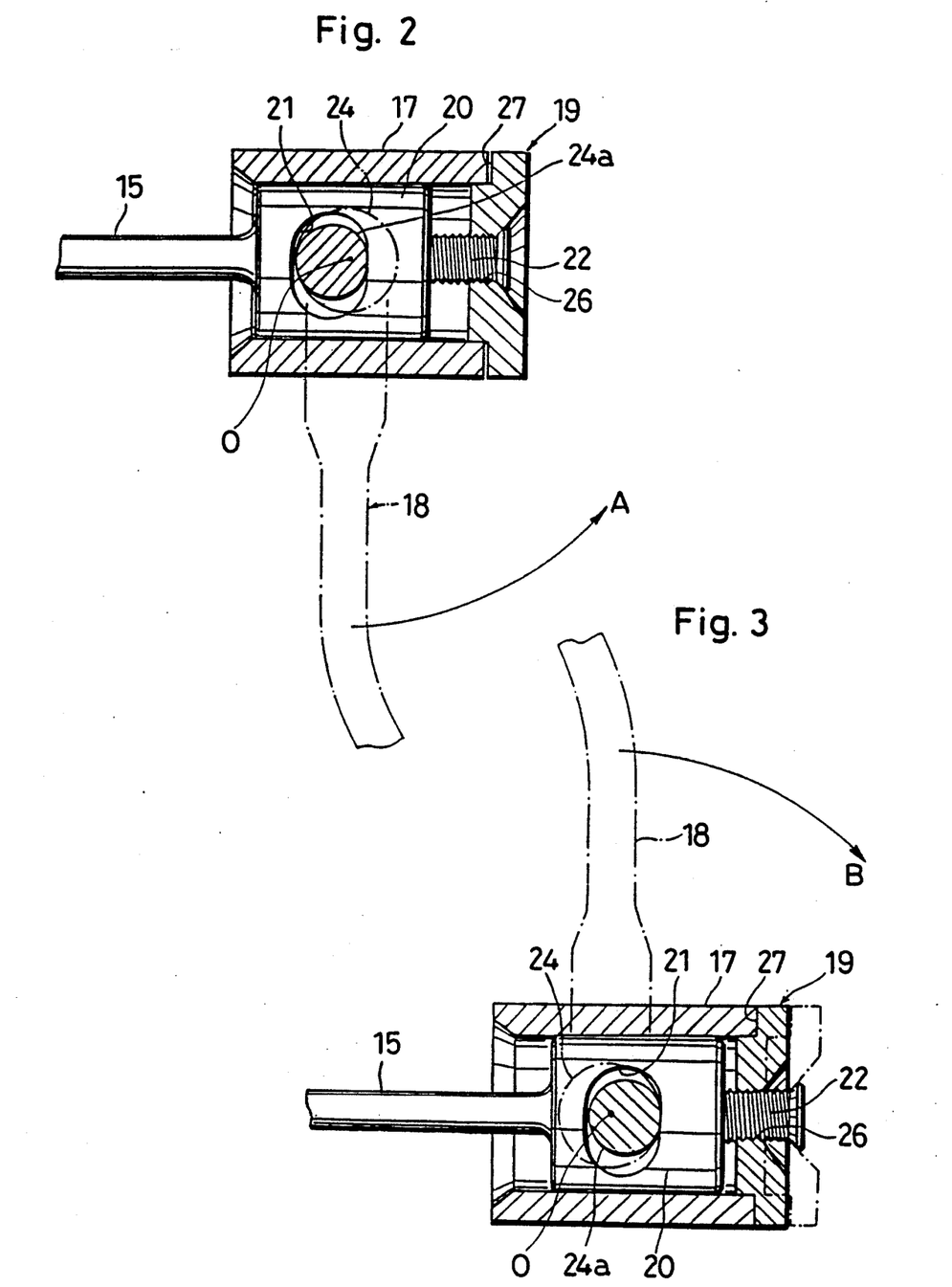
FIG. 2 is an enlarged sectional view, taken on lines II—II in FIG. 1, showing the clamping assembly in a releasing state.
FIG. 3 is an enlarged sectional view similar to FIG. 2 but showing the clamping assembly in a clamping state.

In use, when the lever 18 is in a release position shown in FIG. 2, the cam portion 24a of the lever is located on an axially inner side, and the lock member 19 is located sufficiently away from the enlarged head 20. For fixedly mounting the hub (hub shaft 3, hub shell 6, etc.) to the pair of fork ends 2, the hub shaft 3 is fitted in the mounting cutouts 2a of the fork ends with the end nut 16 and the presser member 17 located axially outwardly of the respective fork ends, and the lever 18 is pivoted in the direction of an arrow A (FIG. 2) to a clamping position shown in FIG. 3. As a result, the cam portion 24a displaces axially outwardly to move the enlarged head 20 axially outwardly relative to the presser member 17 (in other words, axially inward movement of the presser member 17 relative to the enlarged head 20), causing the distance between the nut 16 (FIG. 1) and the presser member 17 to reduce and thereby clamping the fork ends 2 against the respective lock nuts 14 or ball retainers 11.

After the above described clamping operation, the lock member 19 is spaced from the presser member 17 which has displaced axially inwardly, as indicated in phantom lines in FIG. 3. Subsequently, the lock member 19 is axially advanced into abutment, at the stopper portion 27, with the presser member 17.

Under the condition illustrated in FIG. 3, since the position of the lock member 19 relative to the enlarged head 20 is fixed (though variable by turning) due to screw engagement, axially outward displacement of the presser member 17 relative to the enlarged head 20 is completely inhibited by the lock member 19. This means that the hub (wheel) which has been once clamped will not be unexpectedly removed from the fork ends 2.

If the lever 18 is subjected to some force tending to pivot it to the release position (FIG. 2), such pivoting of the lever is reliably prevented because the presser member 17 is prohibited from moving axially outwardly. Further, even in case an extremely large force is applied which is enough to pivot the lever 18 toward the release position with resultant deformation of the cam portion 24a and/or the cam hole 21, the presser member 17 still remains prevented from moving axially outwardly by direct movement prohibition of the lock member 19.

For bringing the clamping assembly into a theftproof condition, the butterfly nut 29 is disengaged from the threaded end 24b of the lever shaft portion 24, and the lever shaft portion is removed from the shaft receiving holes 23 of the presser member 17 and the cam hole 21 of the rod enlarged portion 20. To facilitate removal of the lever shaft portion 24, the lever 18 is pivoted slightly in the releasing direction prior to lever removal for the reason to be described below.

As can be readily understood, most of a reaction force produced upon clamping the hub to the fork ends 2 is applied as a shearing force to the lever shaft portion 24 which has been fully pivoted to its clamping position (FIG. 3), while a small proportion of the reaction force is born by the lock member 19 which has been brought into abutment with the presser member 17. It is obviously difficult in this condition to pull out the lever shaft portion. However, if the lever 18 is pivoted slightly in the releasing direction within the range allowed by a small play or backlash between the cam hole 21 and the lever shaft cam portion 24a, the reaction force is then applied entirely to the lock member 19. In this modified condition, no shearing force is applied to the lever shaft portion 24 which therefore can be taken out very easily.

After the lever 18 is thus taken out, the lock member 19 comes into highly frictional abutment with the presser member 17 because all of the clamping reaction force is applied to the lock member 19, as described above. As result, it becomes very difficult to initiate turning of the lock member 19 for removal. Further, the lever 18 for quickly relieving the clamping force is no longer there. Thus, a thief trying to remove the hub or wheel finds it difficult to do so, ultimately giving up in such an attempt.

In a strict sense, the quick-release type clamping assembly described above is not completely theftproof because the lock member 19 can be screwed off if a special tool is used. However, the absence of the lever 18 makes it impossible to steal the clamping assembly in a complete set. Thus, the clamping assembly of the invention becomes a less attractive target of theft which is not worth committing a crime. In other words, the clamping assembly of the invention greatly reduces the possibility of theft due to combination of actual difficulty of hub removal with mental dampening effect.

For remounting the lever 18, its shaft portion 24 is angularly adjusted for ready insertion into the cam hole 23, and the butterfly nut 29 is again screwed onto the threaded end 24b of the lever shaft portion after complete insertion.

For removing the hub or wheel from the fork ends 2, the lever 18, which has been slightly pivoted in the releasing position, is first pivoted again to its fully clamping position shown in FIG. 3, so that the lever shaft portion 24 bears substantially all of the clamping reaction force to render the lock member 19 easily rotatable. Subsequently, the lock member 19 is loosened and axially outwardly moved to the phantom line position shown in FIG. 3, whereupon the lever is pivoted in the direction of an arrow B to the release position shown in FIG. 2. As a result, the distance between the presser member 17 and the end nut 16 is increased to relieve the hub from the previous clamping force for removal.

Figure 5:
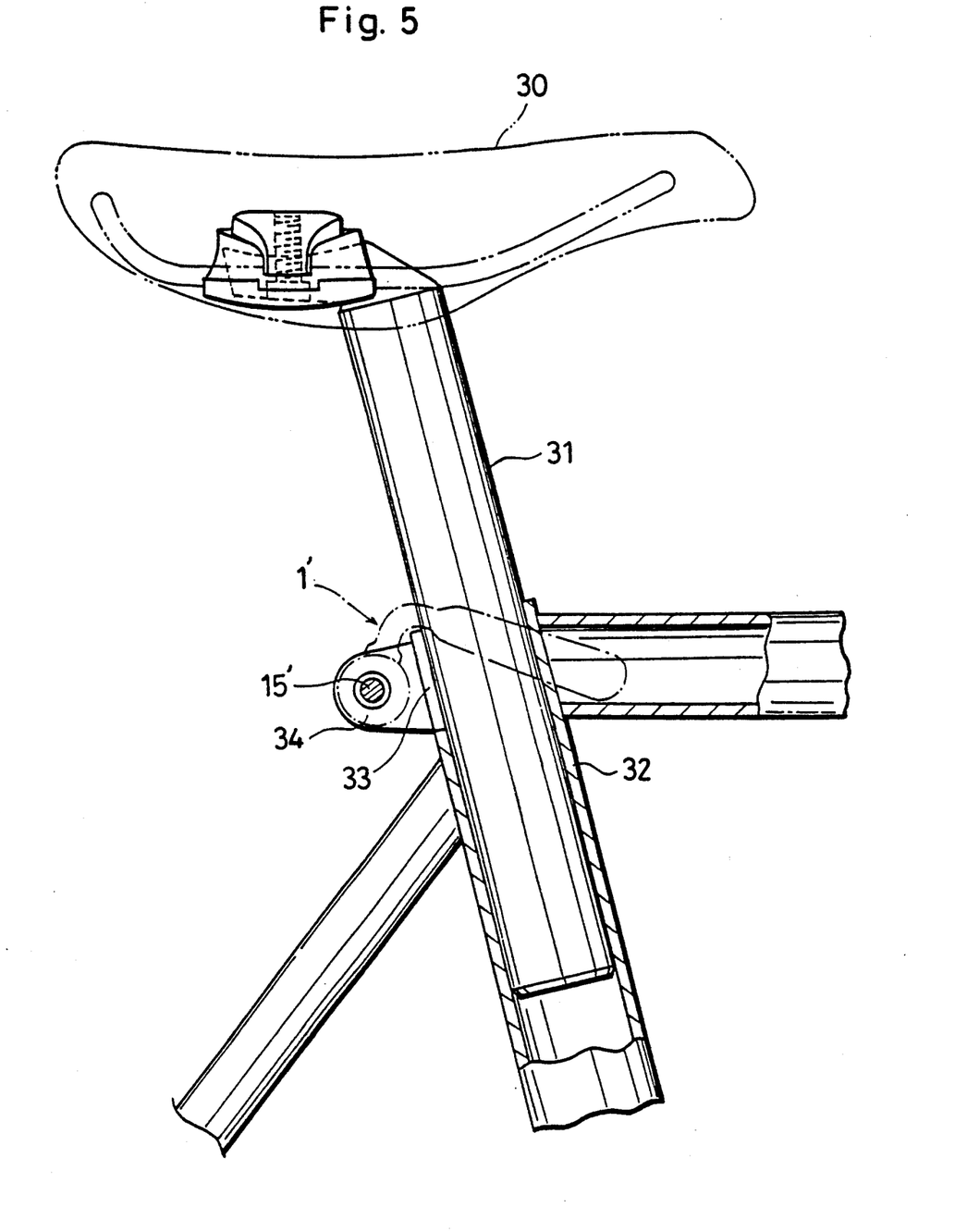
FIG. 5 is a side view showing another theftproof quick-release type clamping assembly according to the invention as used to mount a bicycle saddle to a bicycle frame.
Figure 6:
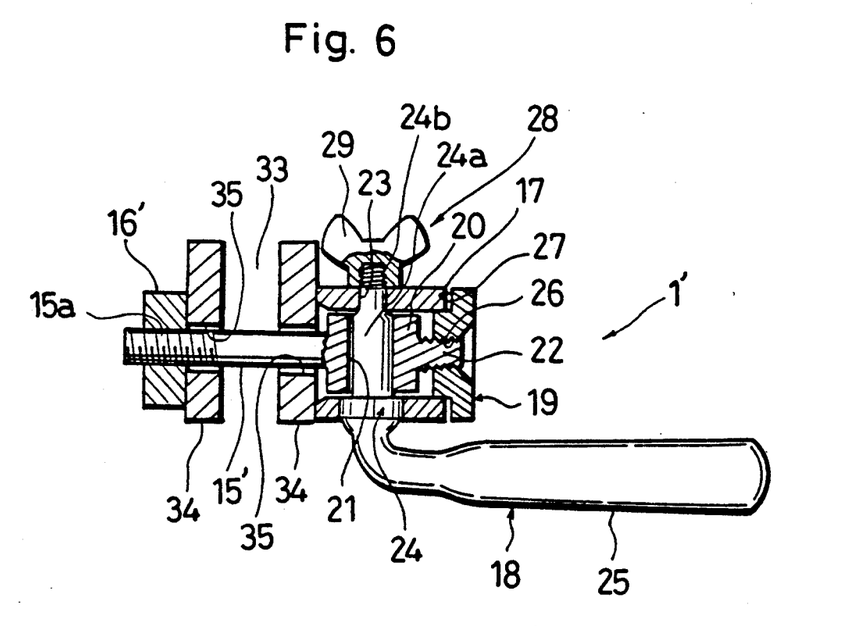
FIG. 6 is a front view, partly in section, showing the clamping assembly of FIG. 5.

FIGS. 5 and 6 show another theftproof quick-release type clamping assembly 1' as used to removably or adjustably fix a bicycle saddle 30. This clamping assembly is substantially identical in configuration to the one (FIG. 1) previously described except for the use of a shorter tie rod 15' and a differently shaped end nut 16'. Thus, the arrangement of the clamping assembly 1' itself is not described here to avoid duplicated explanation.

The saddle 30 is provided on the top of a seat pillar 31 which is inserted into a seat tube 32 of the bicycle frame. The seat tube 32 is formed at the upper end thereof with a longitudinal slit 33 bounded by a pair of clamping flanges 34. Each flange is formed with an insertion hole 35 in alignment with the insertion hole of the other flange.

In use, the tie rod 15' of the clamping assembly 1' is inserted through the respective holes 35 of the clamping flanges 34 with the presser member 17 held into abutment with one clamping flange. The end nut 16' is screwed onto the threaded end portion 15a of the tie rod into abutment with the other clamping flange. In this condition, pivotal movement of the lever 18 in the clamping direction causes the clamping flanges 34 to move toward each other, which results in diametrical reduction, at the longitudinal slit 33, of the seat tube 32 to secure the seat pillar 31 or the saddle 30 at an adjusted position. On the other hand, pivoting of the lever 18 in the releasing direction causes the seat tube 32 to diametrically expand under its own elasticity, consequently allowing sliding movement of the seat pillar 31 for level adjustment of the saddle 30. Obviously, the clamping force achievable by the clamping assembly 1' may be adjusted by changing the axial position of the end nut 16'.

As in the preceding embodiment, the butterfly nut 29 may be screwed off the threaded end 24b of the lever shaft portion 24 to enable removal of the lever 18 after clamping operation. In this way, the saddle 30 is effectively prevented from theft.

Figure 7:
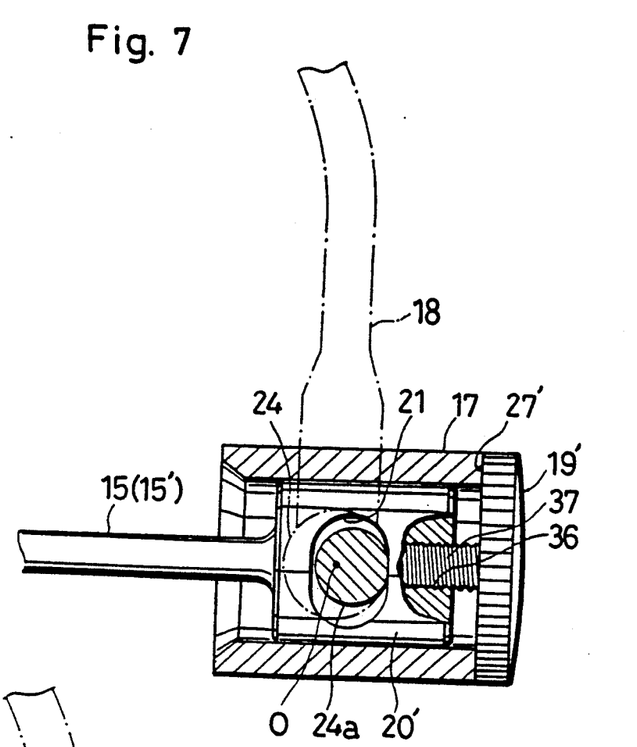
FIG. 7 is a sectional view also similar to FIG. 2 but showing a principal portion of a modified quick-release type clamping assembly according to the invention.

FIG. 7 shows a modification which is applicable to either of the hub clamping assembly 1 (FIGS. 1 to 4) and the saddle clamping assembly 1' (FIGS. 5 and 6). According to this modification, the tie rod 15 (or 15') has an enlarged head 20' which is formed with a threaded axial bore 36, whereas a lock member 19' is in the form of a headed bolt having a threaded shank 37 for engagement with the threaded axial bore 36 of the enlarged head. The head of the bolt 19', when advanced, comes into abutment with the presser member 17 at 27' to prevent axially outward movement of the latter. Though not shown, this modification has a removal facilitating means for the lever 18 to enable theft prevention.

Figure 8:
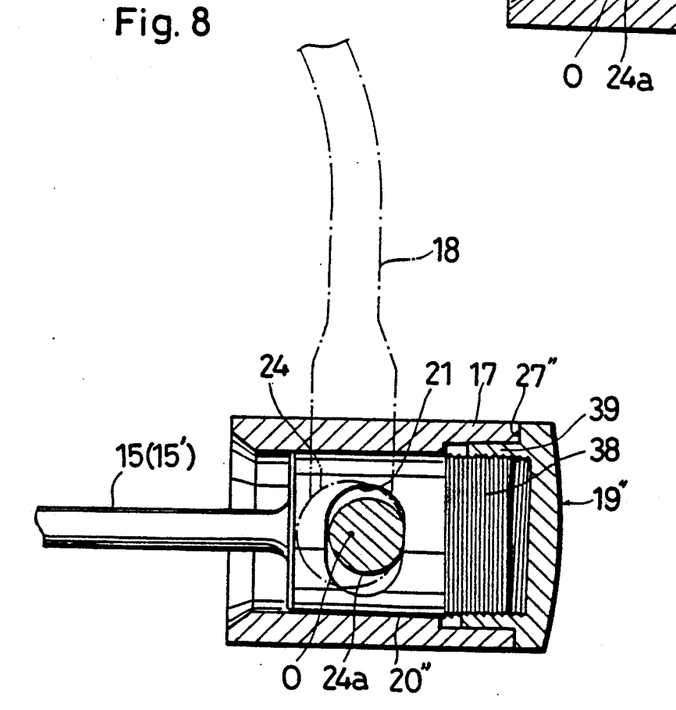
FIG. 8 is a sectional view again similar to FIG. 2 but showing another modified quick-release type clamping assembly according to the invention.

A further modification shown in FIG. 8 is also applicable both to the hub clamping assembly and the saddle clamping assembly. Specifically, an enlarged head 20" of the tie rod 15 (or 15') has a cylindrical outer surface which is threaded at an axially outer end 38 thereof, while a lock member 19" is in the form of a cap nut having a cylindrical projection 39 which is internally threaded for screw engagement with the threaded end 38 of the enlarged head 20". The cap nut or lock member 19" further has an annular stopper portion 27" for abutment with the presser member 17. Though not shown, this modification also has a removal facilitating means for the lever 18 to provide theft prevention.

Obviously, the modified clamping assemblies illustrated already described in connection with the preceding embodiments.

Figure 9:
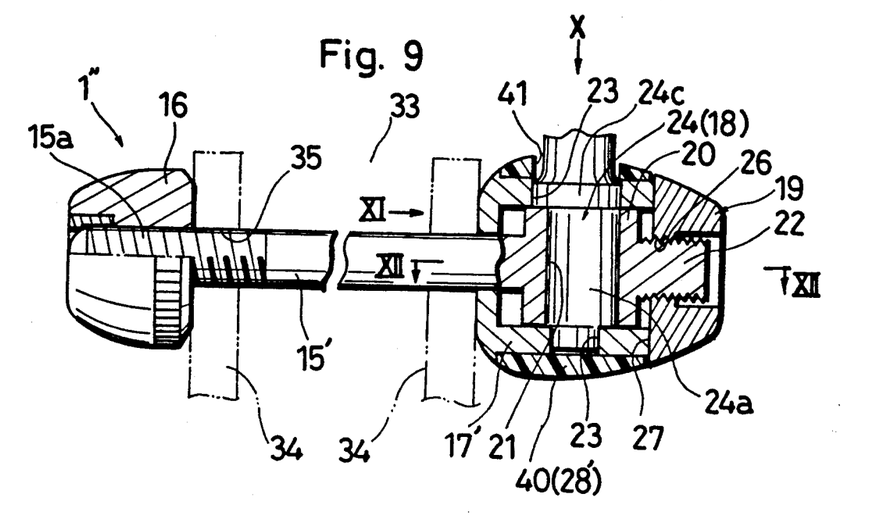
FIG. 9 is a front view, partly in section, showing still another theftproof quick-release type clamping assembly according to the invention.

FIG. 9 represents still another theftproof quick-release type clamping assembly 1" as used to removably or adjustably fix a bicycle saddle (not shown). Basically, this clamping assembly is the same as the one shown in FIGS. 6 and 7, except for the following points.

Figure 10:
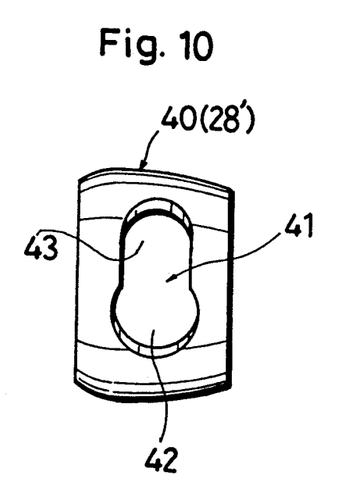
FIG. 10 is a plan view, as seen in the direction of an arrow X in FIG. 9, showing a removal facilitating means.

According to the embodiment shown in FIG. 9, a removal facilitating means 28' for the lever 18 comprises an annular engaging member 40 which is made of a resinous material and rotatably fitted on the outer cylindrical surface of a presser member 17'. As shown in FIG. 10, the engaging member 40 has a lever passage opening 41 which includes a removal portion 42 and a stopper portion 43 extending from the removal portion portion 42, which may be a part of a circle, has a width slightly larger than the diameter of the largest diameter portion or flange 24c of the lever shaft 24. On the other hand, the stopper portion 43 has a width smaller than the diameter of the lever shaft flange 24c.

Normally, the annular engaging member 40 assumes a rotational position in which the narrower stopper portion 43 of the lever passage opening 41 engages the lever shaft flange 24c, so that the lever shaft 24 is prevented from coming out of the cam hole 21 and of the lever receiving holes 23 of the presser member 17'. However, when the annular engaging member 40 is rotationally adjusted to assume another rotational position in which the removal portion 42 of the lever passage opening 41 is in alignment with the lever shaft flange 24c, the lever shaft 24 can be pulled out to provide the intended theft prevention, as described hereinbefore. If required, the engaging member 40 may be further rotated so that the lever receiving holes 23 of the presser member 17' are completely entry after removal of the lever 18.

Figure 11:
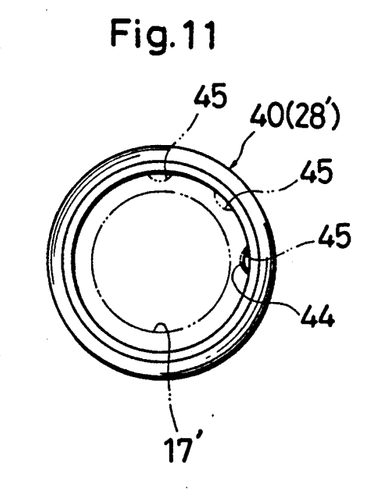
FIG. 11 is a side view, as seen in the direction of an arrow XI in FIG. 9, showing the removal facilitating means.
Figure 12:
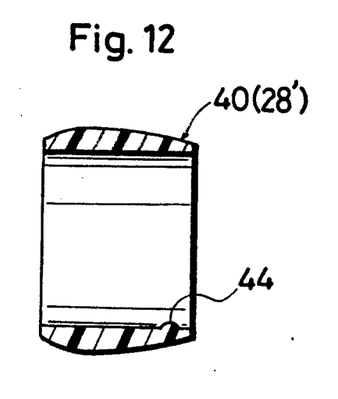
FIG. 12 is a sectional view taken on lines XII—XII in FIG. 9 to show the removal facilitating means.

Preferably, as shown in FIGS. 11 and 12, the annular engaging member 40 is internally formed with a rounded projection 44, whereas the presser member 17' is externally formed with a plurality (three in FIG. 11) of rounded recesses 45. The projection 44 is clickingly engageable with a selected one of the recesses 45. The positions of the recesses 45 correspond to the three different rotational positions (for lever locking, lever removal, and hole concealing) of the engaging member 40 described above. Thus, it is possible to accurately select and retain a required rotational position of the engaging member.

Obviously, the arrangement shown in FIGS. 9 to 12 is advantageous in that the lever 18 can be removed very easily, and in that the absence of the butterfly nut 29 (see FIG. 1) provides a more attractive appearance.

The invention being thus described, it is obvious that the same may be varied in many other ways. For instance, the annular engaging member 40 shown in FIGS. 9 to 12 may be made of a metal. Such variations are not to be regarded as a departure from the spirit and scope of the invention, and all such modifications as would be obvious to those skilled in the art are intended to be included within the scope of the following claims.

I claim:

1. A theft proof quick-release type clamping assembly for mounting a bicycle part comprising:
   a tie rod having one end screwed to an end nut, said rod being provided at the other end with an enlarged head which is formed with a cam hole extending therethrough transversely of said rod,
   a hollow presser member fitted around said enlarged head and movable relative thereto axially of said rod toward and away from said and nut,
   a lever mounted to said presser member and pivotable about a pivotal axis between a clamping position and a releasing position, said lever having a cam portion received within said cam hole and eccentric relative to said pivotal axis for moving said presser member by said cam portion relative to said enlarged head axially of said rod in response to pivotal movement of said lever, lock means provided separately from said lever and operable for limiting axial movement of said presser member away from said end nut when said lever is pivoted to said clamping position, and removal facilitating means for allowing removal of said lever from said presser member without using any tool when said lock means is operated to limit axial movement of said presser member away from said nut, wherein said lever has a shaft portion formed with an annular flange rotatably fitted in a shaft receiving hole of said presser member, said removal facilitating means comprising an annular engaging member rotatably fitted around said presser member, said engaging member being formed with a lever passage opening which engages said flange of said shaft portion in one rotational position of said engaging member but allowing passage of said flange in another rotational position of said engaging member.

2. The clamping assembly as defined in claim 1, wherein said lever passage opening of said engaging member includes a removal portion having a width slightly larger than the diameter of said flange of said lever shaft portion, and a stopper portion having a width smaller than said flange.

3. The clamping assembly as defined in claim 1, wherein said presser member is externally formed with a plurality of rounded recesses which are circumferentially spaced, and said annular engaging member is internally formed with a rounded projection clickingly engageable with a selected one of said recesses upon rotation of said engaging member.

4. The clamping assembly as defined in claim 1, wherein said annular engaging member is made of a resin.

* * * * *